Patented Sept. 4, 1951

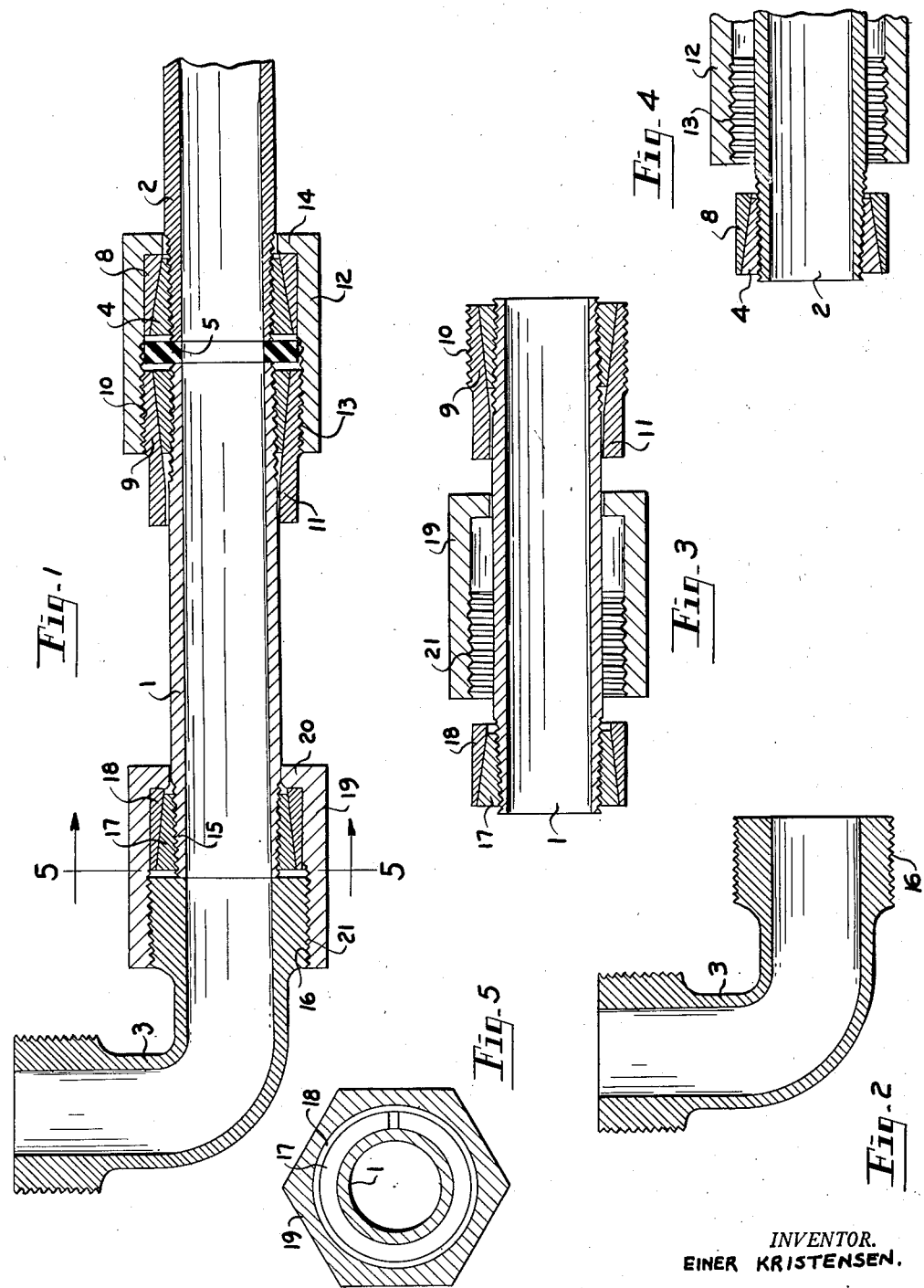

2,567,113

UNITED STATES PATENT OFFICE 2,567,113

PIPE COUPLING

Einer Kristensen, Detroit, Mich.

Application May 28, 1949, Serial No. 96,111

11 Claims. (Cl. 285—126)

The present invention pertains to a novel pipe coupling.

One of the objects of the invention is to provide a pipe coupling that can be assembled without the use of skilled labor and which provides a leak-proof joint. Another object is to provide such a coupling that does not alter the internal diameter of the line at the joint but rather leaves a uniform diameter. Still another object is to provide a coupling that permits any section of pipe to be removed from the line without disturbing the other sections and which permits replacement in like manner. Another object is to form a seal at the butted ends of the adjoining pipe sections rather than only an outside seal.

In the accomplishment of these objects a tapped cone is screwed on the threaded end of one of the sections, with the base of the cone at the extremity of the section. Over the cone is fitted a tapered bushing which tapers oppositely to the cone. A nut is then slipped over the bushing and is formed with an inward flange bearing against the thicker end of the bushing. This nut screws on the adjoining pipe section.

The cone is preferably split longitudinally so that it clamps firmly on the corresponding pipe section by the wedging pressure on the tapered bushing under the action of the flange. Continued turning of the nut brings the meeting ends of the pipe sections into firm and tight abutting relation.

In another embodiment of the invention, the meeting ends of both sections are fitted with cones and bushings as described. An inward flange on the surrounding nut bears against the thicker end of one of the bushings, and the nut screws on the bushing of the other pipe section. A sealing ring of hard metal is inserted between the meeting ends of the pipe sections, and as the nut is drawn up, these ends are brought firmly against the ring. The ring has the same internal diameter as the alined pipe sections, so that the internal diameter is held uniform at the joint. Also, by reason of this ring, the seal is made at the abutting ends rather than solely on the outside of the sections, as in present couplings.

The invention is fully disclosed by way of example in the following description and the accompanying drawings in which:

Figure 1 is a longitudinal section of a pipe coupling;

Figure 2 is a longitudinal section of the elbow;

Figure 3 is a longitudinal section of the coupling separated;

Figure 4 is a longitudinal section of the coupling separated at another point, and Figure 5 is a section on the line 5—5 of Figure 1.

Reference to these views will now be made by use of like characters which are employed to designate corresponding parts throughout.

In Figure 1 are shown two pipes 1 and 2 to be joined together and an elbow 3 to be joined to the pipe 1. The joint between the pipes 1 and 2 will be considered first.

The meeting ends of the pipes are threaded at 4 in the usual manner, and are spaced apart to receive a sealing ring or seat 5 between them. This member is preferably hardened, ground and flat, made of stainless steel, and having the same internal diameter as the pipes. A smooth internal surface is thus obtained at the joint. The ring may be furnished in a series of various thicknesses for correcting fractional errors in the cutting of the pipes to length.

On each threaded end 4 is screwed a tapered cone 6 split longitudinally at 7 for a purpose that will presently be described. The base of the cone is at the joint. On each cone is slipped an oppositely tapered bushing having, however, a uniform outside diameter.

The bushing 8 of the pipe 2 has a smooth outer surface. The bushing 9 on the pipe 1 is threaded at 10 and also has a cylindrical extension 11 from the end remote from the joint.

The bushings 8 and 9 are enclosed in a nut 12 tapped at 13 to engage the threads 10 and formed at its opposite end with an inward flange 14 bearing against the wider end of the bushing 8. In assembling the joint, the cones and bushings are first assembled on the respective pipes. The nut 12 is then mounted on the pipe 2 and the sealing ring 5 set therein. The nut is then screwed on the threaded bushing 9, whereby the ends of the pipes are drawn against the ring 5 and the split cones 8 and 9 are wedged by the bushings and clamped on the pipes. In other words, the cones are then clamped tight, and the continued turning of the nut then draws the pipes together.

At the elbow 3, the other end of the pipe 1 is threaded at 15 and the adjacent end of the elbow is also threaded at 16 in the usual manner. The end 15 makes a split and tapped cone 17 similar to the member 4, and over the cone is slipped a tapered bushing 18 similar to the member 8. As in the coupling between the pipes, the wider end of the cone and the narrower end of the bushing are at the joint.

A nut 19 similar to the nut 12 is slipped over the pipe 1, with its inward flange 20 bearing against the bushing 18. The opposite end of the nut 19 is tapped at 21, and this end is screwed on the threads 16. The bushing 18 is thereby wedged on the split cone 17 tightening it on the pipe 1, after which the continued turning of the nut draws the pipe 1 and coupling 3 together.

The assembling of the joints in the manner described requires no particular skill and is always accurate. In this connection, however, are accurately machined at the shop, with the result that all contacting surfaces are in full engagement and a perfect joint is made.

What I claim is:

1. A pipe coupling comprising, in combination with a pair of alined pipe sections, one of which is threaded at the meeting end, a cone on the meeting end of the other pipe, an internally tapered bushing fitted on said cone and tapering oppositely to said cone, and a nut enclosing said bushing and adapted to be screwed on an adjoining pipe section, said nut having an inward flange engaging the thicker end of said bushing, and mutually engaging radially extending means on said cone and the pipe end enclosed thereby and abutting each other on movement of said cone toward the threaded pipe end, whereby to draw said pipe ends into sealing engagement on tightening said nut.

2. A pipe coupling comprising, in combination with a pair of alined pipe sections, one of which is threaded at the meeting end, a cone on the meeting end of the other pipe, said cone being split longitudinally, an internally tapered bushing fitted on said cone and tapering oppositely to said cone, and a nut enclosing said bushing and adapted to be screwed on an adjoining pipe section, said nut having an inward flange engaging the thicker end of said bushing, and mutually engaging radially extending means on said cone and the pipe end enclosed thereby and abutting each other on movement of said cone toward the threaded pipe end, whereby to draw said pipe ends into sealing engagement on tightening said nut.

3. A coupling comprising, in combination with a pair of alined pipe sections threaded at the meeting ends, a cone threaded on one of said sections with its base at the end of said section, a tapered bushing fitted on said cone and tapering oppositely to said cone, and a nut enclosing said bushing and screwed on the other pipe section, said nut having an inward flange engaging the thicker end of said bushing, whereby to draw said pipe ends into sealing engagement on tightening said nut.

4. A coupling comprising, in combination with a pair of alined pipe sections threaded at the meeting ends, a cone threaded on one of said sections with its base at the end of said section, said cone being split longitudinally, a tapered bushing fitted on said cone and tapering oppositely to said cone, and a nut enclosing said bushing and screwed on the other pipe section, said nut having an inward flange engaging the thicker end of said bushing, whereby to draw said pipe ends into sealing engagement on tightening said nut.

5. A pipe coupling comprising in combination with a pair of alined pipe sections, one of which is threaded at the meeting end, a pair of cones on the meeting ends of said pipe sections, with their bases at the extremities of the respective sections, a tapered bushing fitted on each cone, said bushings tapering oppositely to said cones, and a nut enclosing said bushings, said nut having a flange engaging the thicker end of one of said bushings and being threaded on the other bushing, and mutually engaging radially extending means on each cone and the pipe enclosed thereby and abutting each other on movement of said cone toward the threaded pipe end, whereby to draw said pipe ends toward each other on tightening said nut.

6. A pipe coupling as defined in claim 5, wherein said bushings are split longitudinally.

7. A pipe coupling comprising in combination with a pair of alined pipe sections, one of which is threaded at the meeting end, a pair of cones on the meeting ends of said pipe sections, with their bases at the extremities of the respective sections, a tapered bushing fitted on each cone, said bushings tapering oppositely to said cones, a sealing ring inserted between said bushings, and a nut enclosing said bushings, said nut having a flange engaging the thicker end of one of said bushings and being threaded on the other bushing, and mutually engaging radially extending means on each cone and the pipe enclosed thereby and abutting each other on movement of said cone toward the threaded pipe end, whereby to draw said pipe ends toward each other on tightening said nut.

8. A coupling comprising, in combination with a pair of alined pipe sections threaded at the meeting ends, a pair of tapped cones threaded on the meeting ends of two pipe sections to be joined, with their bases at the extremities of the respective sections, a tapered bushing fitted on each cone said bushings tapering oppositely to said cones, and a nut enclosing said bushings, said nut having a flange engaging the thicker end of one of said bushings and being threaded on the other bushing, whereby to draw said pipe ends into sealing engagement with said ring on tightening said nut.

9. A coupling as defined in claim 8, wherein said bushings are split longitudinally.

10. A coupling as defined in claim 8, further characterized by a sealing ring inserted between said bushings and having the same internal diameter as said pipe sections.

11. A coupling as defined in claim 8, wherein said bushings are split longitudinally, and further characterized by a sealing ring inserted between said bushings and having the same internal diameter as said pipe sections.

EINER KRISTENSEN.

REFERENCES CITED

The following references are of record in the file of this patent:

UNITED STATES PATENTS

| Number | Name | Date |
|---|---|---|
| 438,023 | Rylands | Oct. 7, 1890 |
| 762,545 | Merriam | June 14, 1904 |
| 1,936,815 | Wilkinson | Nov. 28, 1933 |
| 2,452,276 | Woodling | Oct. 26, 1948 |

FOREIGN PATENTS

| Number | Country | Date |
|---|---|---|
| 815,528 | France | Apr. 12, 1937 |